March 31, 1936.   F. W. ADSIT   2,035,857
AUTOMATIC CARTON FORMING AND STACKING MACHINE
Filed Dec. 8, 1932   3 Sheets-Sheet 1
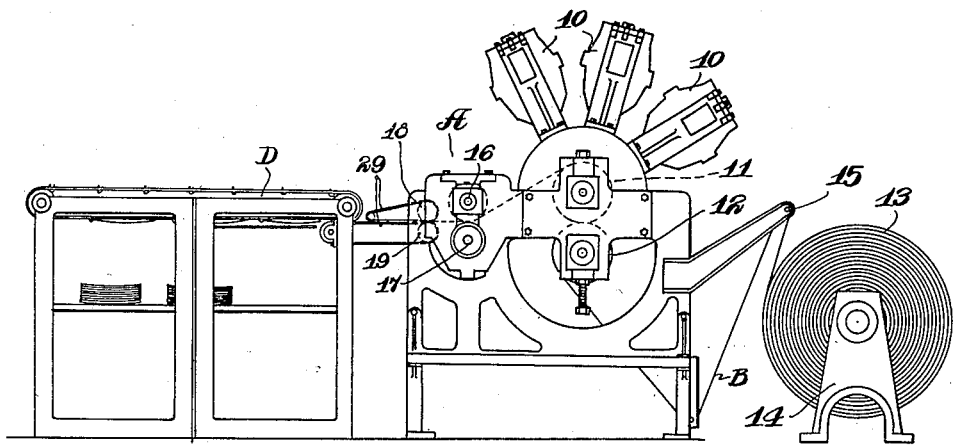
Fig. 1
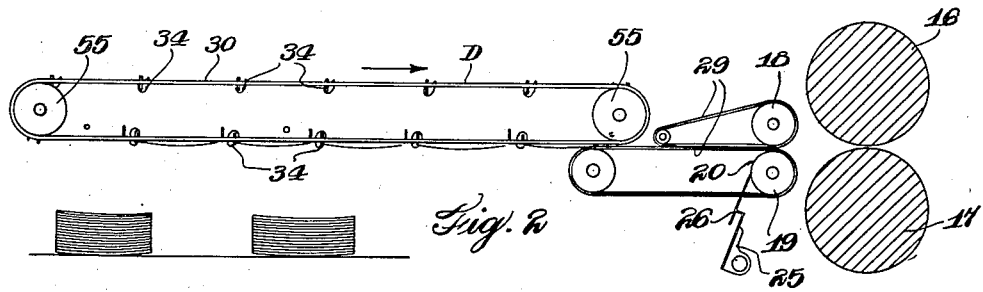
Fig. 2
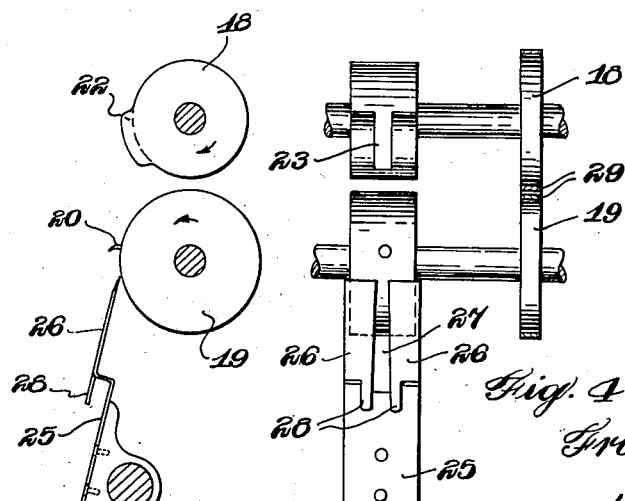
Fig. 3
Fig. 4
Inventor
Frank W. Adsit
By Horace Pitcher
Attorney March 31, 1936.  F. W. ADSIT  2,035,857

AUTOMATIC CARTON FORMING AND STACKING MACHINE

Filed Dec. 8, 1932  3 Sheets-Sheet 2

Inventor
Frank W. Adsit
By Honour Richey
Attorney

March 31, 1936.  F. W. ADSIT  2,035,857
AUTOMATIC CARTON FORMING AND STACKING MACHINE
Filed Dec. 8, 1932  3 Sheets-Sheet 3
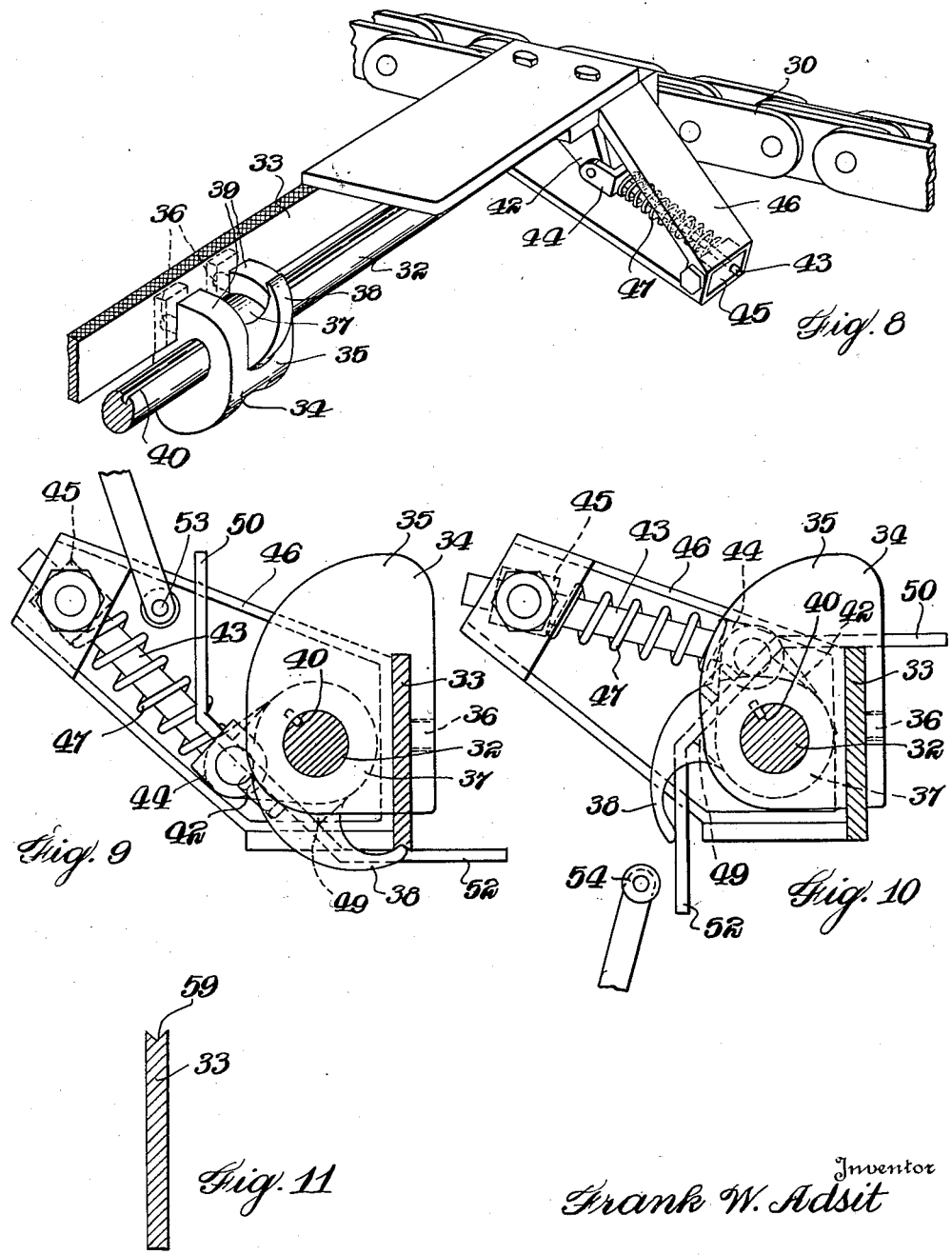

Patented Mar. 31, 1936

2,035,857

UNITED STATES PATENT OFFICE 2,035,857

AUTOMATIC CARTON FORMING AND STACKING MACHINE

Frank W. Adsit, St. Paul, Minn., assignor to Rotary Carton Machine Company, Minneapolis, Minn., a corporation of Minnesota Application December 8, 1932, Serial No. 646,240

15 Claims. (Cl. 93—58)

This invention relates to an improvement in automatic stripping and stacking mechanism particularly adapted for use with my printing and cutting press where intricate portions must be separated after the cutting and which are ordinarily difficult to remove. This mechanism is for the purpose of automatically stripping or picking waste stock from between blanks which have been automatically cut from a continuous sheet of material, and for sorting and stacking these blanks after the cutting and stripping operation.

It is an object of my invention to provide a simple and effective means of stripping waste stock from blanks cut from a sheet of material. This stripping operation takes place immediately after the cutting operation, and acts to remove all pieces of waste stock from within or between the various blanks. For the purpose of illustration, I have shown my stripping mechanism in combination with a rotary printing and cutting machine designed for the formation of cartons and the like. The carton blanks are cut from a continuous sheet of material in such a manner that very little waste is provided. However, small pieces of waste remain between the various cartons after the cutting operation and must be removed. My stripping mechanism operates in an efficient manner to remove even the smallest of these pieces of waste stock in an effective manner.

It is also an object of my invention to provide a stripping mechanism which will function directly in combination with the printing and cutting press. The sheet of material from which the blanks are formed may in this manner be printed by rotary printing cylinders, on both sides if desirable, may be cut by rotary cutting cylinders after leaving the printing cylinders, and are stripped or picked out by stripping cylinders after leaving the cutting rolls, all of which operations are automatic. My sorting and stacking mechanism automatically discharges the blanks in neat piles ready for use. In this manner the entire carton blank may be formed in one continuous automatic operation.

It is an object of my invention to provide a means of removing the waste stock from the stripping rolls after these rolls have removed the waste from the blanks. This waste removing means is so designed that there is no danger of having the waste stock jam or clog the stripping rolls. The waste is guided away from the stripper rolls and permitted to drop freely away from the mechanism. This is very important owing to the automatic action of my rotary machine, for accomplishing these results because the machine may travel at a high rate of speed and must be kept clear at all times.

It is a purpose of my invention to provide a sorting and stacking means for conveying the blanks from the printing, cutting and stripping mechanisms, and dropping the blanks into piles, sorting one type of blank from another. This is accomplished by tripping the conveyor at more than one point in the longitudinal direction of travel. A sheet of stock material may be wide enough to permit the formation of two or three blanks transversely of the sheet. Each of these blanks may be printed differently if desired, as each blank will fall in a different pile as soon as released by the conveyor. If desired, alternate transverse rows of two or three cartons each may be printed differently, and separated by tripping alternate transverse rows of blanks at different points along the longitudinal travel of the conveyor. In this manner a large number of blanks of different design may be printed simultaneously, and sorted so that each type of blank will be piled separately.

It is an added feature of my invention that the various elements of the sorting and stacking mechanism are readily adjustable to accommodate a great number of conditions and to accommodate variously shaped cartons and the like. Accordingly, my machine may be quickly regulated to fit various required operations and to perform the same in a desirable manner.

These objects, together with other purposes and novel features of the invention will be more clearly and fully set forth in the following specification and claims.

In the drawings forming a part of this specification:

Figure 1 is a side view of a printing and cutting press in which my stripping mechanism and sorting and stacking mechanism is incorporated.

Figure 2 is a diagrammatic side elevation view, showing the relationship between the cutting rolls, the stripping rolls, the conveyor, and the sorting and stacking mechanism.

Figure 3 is a diagrammatic side view of the stripping mechanism.

Figure 4 is a front elevation view of the stripping mechanism illustrated in Figure 3.

Figure 8 is a perspective view of the gripping mechanism on the conveyor for gripping the blanks during the time they are conveyed by the conveyor.

Figure 9 is a side elevation view of the gripping mechanism in closed position gripping a carton blank.

Figure 10 is a side elevation view of the gripping mechanism in open position.

Figure 11 is a cross-sectional view of a detail portion of the stacking mechanism.

Figure 5:
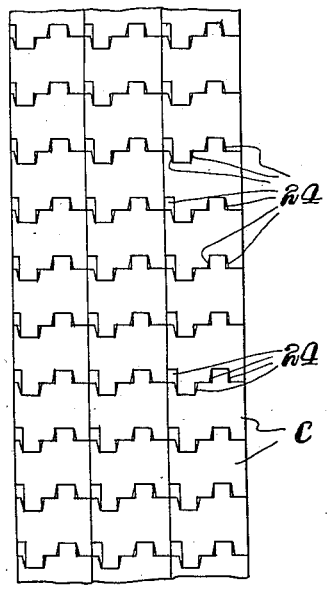
Figure 5 is a sheet of material divided into blanks, showing the small amount of stock wasted in the formation of the carton blanks.
Figure 6:
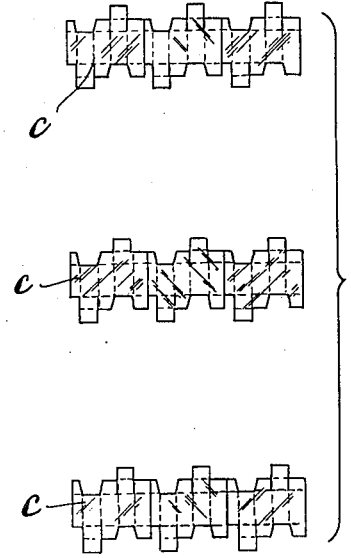
Figure 6 illustrates spaced rows of blanks as they would appear passing through the sorting mechanism.

The rotary press A is provided with inking and printing units 10 circumferentially adjustable about the cylinders 11 and 12. Each of the units 10 may print in a different color, so that the carton blanks may be printed in several colors in a single process. If desired, the units 10 may be adjusted about the lower cylinder 12, in order that both sides of the blanks may be printed.

A sheet of material is fed from the supply roll 13 on the standard 14 over the roller 15 and between the cylinders 11 and 12 where it is printed. After the sheet B is printed, it passes between cutting rollers 16 and 17, which cut the material into blanks of the desired shape. Any desired shape or form may be provided by employing cutting rolls of the proper shape and configuration.

The sheet B passes through the cutting and scoring rollers 16 and 17 to the stripping and picking rollers 18 and 19. These stripping rollers act to engage the waste portions of stock within and between the various blanks, and to remove this waste. The upper roller 18 merely contacts with the top of the carton, holding the same in proper position when the scrap or waste is being removed. The surface of the upper roller 18 is grooved to accommodate a pin or prong 20 formed on the lower roller 19. This groove 22 is centrally disposed in the engaging surface of the roller 18. The engaging surface 23 extends only the necessary length to hold the blanks while the scrap or waste is being removed, and the roller 18 is preferably cut away to a smaller diameter where this engagement with the blank is not necessary, to prevent any danger of marring the printing or the surface of the blank.

The lower roller 19 is provided with one or more prongs 20 depending on the size and shape of the waste stock to be removed thereby. The prongs 20 are slightly hook shaped, and act to hook through the waste stock and carry it away from the blanks. The circumference of the roller 19 is preferably the length of the carton, so that each prong operates at a certain point where necessary. As the waste or scrap portions 24 are small, a very definite relationship is maintained between the cutting rollers and the stripping mechanism.

A means is provided for removing the waste stock from the prongs 20 of the stripping mechanism. This means consists of an arm 25 having a pair of offset fingers 26 extending therefrom. These fingers 26 extend into proximity with the roller 19, straddling the prong 20. As the prong 20 passes between the ends of the fingers 26, these fingers scrape off any scrap carried by this prong. The scrap is permitted to slide along the surface of the fingers 26 and drop into a suitable receptacle. If one piece of waste jams into the groove 27 between the fingers 26, the next waste portion 24 acts to either release it, force it farther down in the slot 27, or drop it entirely through the slot. In any case, the scrap will be removed from the prong 20, and will fall clear from the fingers 26. The offset formation of these fingers act to guide the scrap away from the arm 25. Lips 28 act to extend the groove 27 beyond the offset connecting portion of the fingers 26, so that any scrap extending partially into the groove will be guided past this connecting portion.

From the stripping rollers 18 and 19, the carton blanks C are carried by belts 29 to the conveyor D. The conveyor D is travelling at a greater rate of speed than is the sheet B in the printing press A, accordingly each transverse row of carton blanks C is carried swiftly by the conveyor D, tending to separate the rows one from another slightly. After each transverse row of blanks C is gripped by suitable means on the conveyor, the increased speed of the conveyor gradually separates the row of cartons gripped from the following transverse row until it in turn is gripped. This provides an opportunity for the gripping means to operate between subsequent rows of cartons which otherwise would be closely adjacent one another, being formed from a continuous sheet.

The conveyor D is formed of two or more chains or belts 30, one positioned on each side thereof. At intervals throughout the length of each chain, oppositely disposed bearings are mounted to accommodate the ends of shafts 32 extending between these chains 30. Angle members 33 are secured to the chains 30 extending along one side of, and over, the shafts 32. One side of each of these angle members is cut away centrally throughout the greater portion of the length of the member, to accommodate the gripping members 34.

The gripping members 34 fit over a shaft 32. Each gripping member comprises a bifurcated body portion 35 which is transversely grooved to fit over the side of the angle member 33 which has not been cut away. Set screws 36 through the body portion and adapted to be tightened against the angle member 33 hold the gripping member in any adjusted position along the shaft 32. A collar 37 provided with a gripping finger 38 is interposed between the bifurcated sides 39 of the body portion. The collar 37 is keyed to the shaft 32, the key being held in place by the bifurcated sides 39. A keyway 40 extending through the length of the shaft 32 permits the gripping member 34 to slide along the shaft 32.

Adjacent one end of each shaft 32 is secured a short arm 42. This arm 42 is pivotally connected to the rod 43 by means of the yoke end 44 formed on the rod 43. The rod 43 extends through a block 45 pivotally mounted near the vertex of a V-shaped bracket 46 on the angle member 33. A compression spring is interposed between the block 45 and the yoke end 44 of the rod 43. As the shaft 32 is rotated, the spring 47 is compressed until the arm 42 passes center position. The mounting of the collar 37 bearing the gripping finger 38 on the shaft 32 permits the shaft to rotate through but a limited movement. The spring 47 holds the gripper finger 38 in either extreme open or closed position at all times when it is not being rotated from one position to another.

Each shaft is provided with a trip 48. This trip is secured to a collar 49 secured against turning upon the shaft 32. The trip 48 is angularly shaped, having one arm 50 extending inwardly from the shaft 32 when the gripping finger is in closed position as illustrated in Figure 9, and having another arm 52 which extends outwardly from the shaft 32 when the gripping finger is in open position, as illustrated in Figure 10. When the gripping finger 38 is in closed or gripping position, the arm 50 is in the path of a tripping roller 53 and the arm 52 is rotated out of the path of its tripping roller 54. When the gripping finger 38 is in open position, the arm 52 is in position to be engaged by the tripping roller 54 and the arm 50 is rotated out of engaging position. The gripper closing trip roller 54 is positioned adjacent the feeding belts 29. As the conveyor chains 30 move over the sprockets 55 in the direction of the arrow until a shaft 32 carrying a number of gripping members 34 is positioned adjacent the feeding belts, the arm 52 on the trip 48 of that particular shaft 32 engages the tripping roller 54. This rotates the shaft 32 past center position, and the spring 47 acts to close the gripping fingers 38 against the angle member 33, gripping a carton blank C which has been fed into position by the belts 29 therebetween. In a similar manner, each shaft 32 is rotated successively upon reaching gripping position by the trip 48.

The tripping roller 53 is positioned in the path of the trips 48 near the end of the conveyor, and acts to open the gripping fingers 38 to release the carton blanks C. Each of the trips 48 is operated by the tripping roller 53, unless a shaft has been previously rotated to open the gripping fingers 38 and to rotate the arm 50 out of engaging position.

Figure 7:
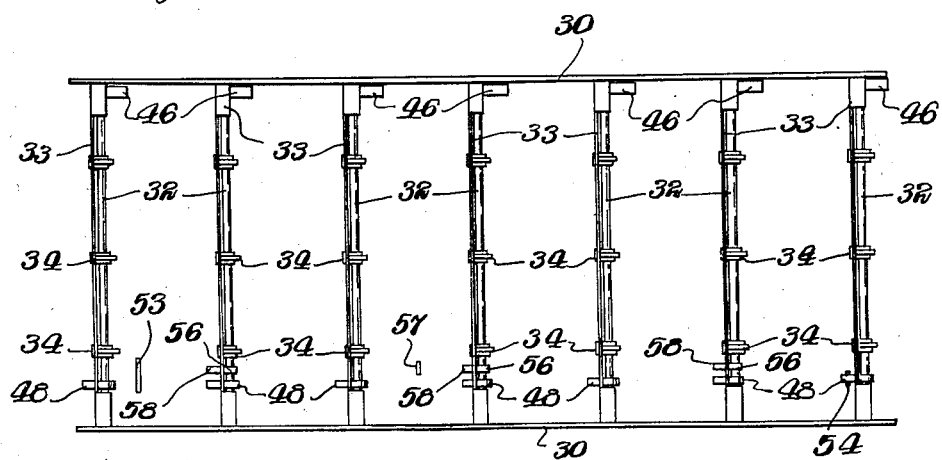
Figure 7 is a diagrammatic plan view of the conveyor means embodying the sorting and stacking mechanism.

If it is desired to trip some of the shafts to release a part of the carton blanks C at another point, it is only necessary to provide an additional trip 56 on the shafts to be tripped, and to provide a tripping roller 57 at any point along the length of the conveyor. The trip 56 must be equipped with an arm 58 which is similar to the arm 50, but does not require an arm similar to the arm 52. The trips 56 are mounted on the desired shafts 32, out of line with the trips 48 and the tripping rollers 53 and 54, and are only operated by the tripping roller 57. If the blanks are printed so that dissimilar carton blanks C appear in adjacent transverse rows, it is only necessary to provide a trip 56 on alternate shafts 32, as is indicated diagrammatically in Figure 7 of the drawings, and alternate transverse rows of carton blanks C will be tripped by the tripping roller 57 previously to the tripping of the remaining transverse rows by the tripping roller 53. The carton blanks C are thus sorted. In a similar manner, additional trips may be added to cause every third carton to fall in a third pile.

In order to cause the gripping fingers 38 to grip the carton blanks C securely, I score or roughen the edge of the angle member 33 against which the gripping fingers 38 clamp the blanks. This roughened edge may be seen in Figure 8 of the drawings. If it is desired, a V-shaped groove 59 may be formed in the angle member 33, as illustrated in Figure 11, forming sharp engaging edges which do not permit the carton to slip.

The slightly hook-shaped or curved prongs 20 are sufficiently small to remove even a minute portion of scrap or waste stock. The construction of the stripping mechanism is such that the waste stock is permitted to fall freely from the same. The conveying mechanism acts in an efficient manner to carry the blanks into any desired position, and acts to sort and stack the blanks to separate one type of carton from another.

In accordance with the patent statutes, I have described the principles of operation of my stripping and stacking mechanism, and while I have endeavored to set forth the best embodiment thereof, I desire to have it understood that this is only illustrative of a means of carrying out my invention, and that obvious changes may be made within the scope of the following claims without departing from the spirit of the invention.

I claim:

1. The combination, an automatic rotary printing and cutting machine adapted to print and cut blanks of a desired shape automatically from a continuous sheet including, a stripping picker adapted to automatically remove the stock between and about the died-out blanks, and a carrier having means for depositing the died-out blanks free of waste stock in sorted piles.

2. The combination, a printing and cutting machine for automatically printing and cutting out blanks from a continuous sheet, a rotary stripping means having a picker element adapted to pick and strip the waste stock from the sheet about the died-out blanks, and means for automatically carrying and piling the died-out blanks into different piles.

3. A printing, engraving, embossing machine including, means for dieing out articles into series of pre-determined designs and shapes other than rectangular, each comprising a series of transversely aligned units, and means engaging each unit for piling each of the respective shapes in their respective individual piles.

4. A carrier and stacker for carton machines and the like, means for engaging the individual cartons, means for tripping said engaging means at a pre-determined point to stack the cartons into one or more piles at different intervals of the travel of said carrier, and secondary safety tripping means to insure the dropping of the cartons from the carrier.

5. An endless carrier for machines for making cartons and the like including, carton engaging means adapted to engage the individual cartons as they come from the carton machine after they have been stripped of waste stock, trip means for dropping the cartons at pre-determined points in a manner to permit the cartons to be stacked in different piles, and safety trip means to insure the dropping of the cartons from the carrier to prevent cartons from being carried back to the receiving end thereof.

6. The method of making cartons by continuous operation at high speed consisting in moving a continuous sheet and impressing the same during movement with a decorative surface, then die-cutting and scoring into individual flat edge to edge and side by side containers of irregular outline, then strip picking the waste stock from the died-out blanks, and then engaging each blank and piling the died-out blanks in one or more piles.

7. A rotary scrap stripping device for carton and the like machines including, a pair of rotating members between which the carton and the stock from which it is cut are adapted to pass, means for setting said rotary members in a manner to aline with the scrap stock between and about the died-out cartons, said rotary members including a relatively short contacting surface on one of the same to engage with the stock and carton surface at a point where the scrap is adapted to be stripped therefrom, and a picking member carried by the other of said rotary members adapted to coincide with the contacting surface on the other rotary member in rotation of said rotary members to pick and strip the scrap stock from between and about the carton blanks.

8. A stripping device for carton and the like machines including, rotary members between which the stock and cartons are adapted to pass, means for rotating said members, a pair of arcuate lugs formed on one of said members spaced apart to form a slot therebetween, a picking and stripping point carried by the other of said members adapted to rotate through said slot to pick the scrap stock from between and about the cartons and stock passing between said rotary members, and a stripper shield associated with said rotary member carrying said picking and stripping point between which said point is adapted to rotate to strip the same of any scrap stock adhering to said point in the rotation thereof.

9. A rotary scrap stripping and picking means including, a pair of rotatable members between which the scrap stock is adapted to pass, a short projecting supporting surface on one of said rotary members for holding the scrap stock in close proximity to the other of said rotary members, a picking stripping point on the other of said rotary members adapted to pick and strip the scrap stock at the moment the scrap stock is engaged by said projecting supporting surface, and means for automatically stripping the scrap stock from said stripping and picking point.

10. A machine having means for cutting a series of different pre-determined shaped articles each comprising a series of transversely aligned units from a sheet fed into said machine, and means for automatically sorting and stacking each of the series of the cut out shapes into respective individual piles.

11. A rotary printing and cutting machine adapted to operate at high speed including, a carrier having gripping fingers adapted to move faster than the speed of said printing and cutting means to separate the cut edges of the articles formed on said machine, thus drawing the articles from the delivery end of said machine apart to permit engagement by the gripping fingers.

12. A rotary printing and cutting machine, cutting a series of different died-out articles, a rotary stripping means for separating the scrap from the died-out articles, a carrier having means for drawing the articles away from said printing, cutting and stripping means and including an automatic tripping means for stacking each of the different died-out articles in respective separate piles.

13. A stripping device including a pair of cooperating rollers, a recess in one roller, a curved pointed projection on the other roller adapted to extend into said recess, and means for rotating said rollers in unison.

14. A stripping device including, a pair of cooperating rollers, one of said rollers being smaller than the other, a cam-like projection on said one roller, a recess in said cam-like projection, and a picking means on the other roller extendable into said recess.

15. A conveyor for printed sheets including a transversely extending bar, means supporting said bar to travel in an endless path, gripper means supported in proximity to said bar, and engageable with said bar to grip the sheets therebetween, and a V-shaped groove extending longitudinally on said bar against which said sheets are clamped by said grippers.

FRANK W. ADSIT.